United States Patent [19]
Perotto

[11] Patent Number: 5,970,880
[45] Date of Patent: Oct. 26, 1999

[54] PYROTECHNIC GAS GENERATOR WITH ADAPTABLE FLOW RATE AND VOLUME FOR AIR BAGS

[75] Inventor: Christian Perotto, Ballancourt, France

[73] Assignee: LIVBAG S.N.C., Vert Le Petit, France

[21] Appl. No.: 09/039,423

[22] Filed: Mar. 16, 1998

[30] Foreign Application Priority Data

Mar. 14, 1997 [FR] France .................................. 97 03062

[51] Int. Cl.⁶ ................................................. B60R 21/26
[52] U.S. Cl. ........................................ 102/531; 280/741
[58] Field of Search ................................. 102/530, 531; 280/736, 740, 741, 742

[56] References Cited

U.S. PATENT DOCUMENTS

| | | | |
|---|---|---|---|
| 3,972,545 | 8/1976 | Kirchoff et al. | 102/530 |
| 4,950,458 | 8/1990 | Cunningham | 102/530 |
| 5,219,178 | 6/1993 | Kobari et al. | |
| 5,645,298 | 7/1997 | Stevens et al. | 102/531 |
| 5,671,946 | 9/1997 | Whalen et al. | 280/741 |
| 5,794,973 | 8/1998 | O'Loughlin et al. | 102/531 |
| 5,799,973 | 9/1998 | Bauer et al. | 280/741 |

FOREIGN PATENT DOCUMENTS

| | | |
|---|---|---|
| 428 298 | 5/1991 | European Pat. Off. . |
| 733 519 | 9/1996 | European Pat. Off. . |
| 757 026 | 2/1997 | European Pat. Off. . |

*Primary Examiner*—Harold J. Tudor
*Attorney, Agent, or Firm*—Pillsbury Madison & Sutro, LLP

[57] ABSTRACT

The invention relates to a pyrotechnic hot-gas generator intended for motor vehicle safety.

The generator is in the form of a one-piece cylindrical tube (1) which is broken down into an upstream part (7) and a downstream part (10) each containing in particular an igniter (13, 14) and a pyrotechnic charge, and which flank an intermediate part (8) constituting a diffuser. The upstream part (7) and the downstream part (10) are each separated from the intermediate part (8) by an internal partition (3, 4) bearing a closed-off nozzle (5, 6). A safety valve (26) is pressed against the partition (4) and makes it possible to vary the volume of gas generated or the rate of inflation of the bag in accordance with the electrical signals received by the generator.

10 Claims, 2 Drawing Sheets

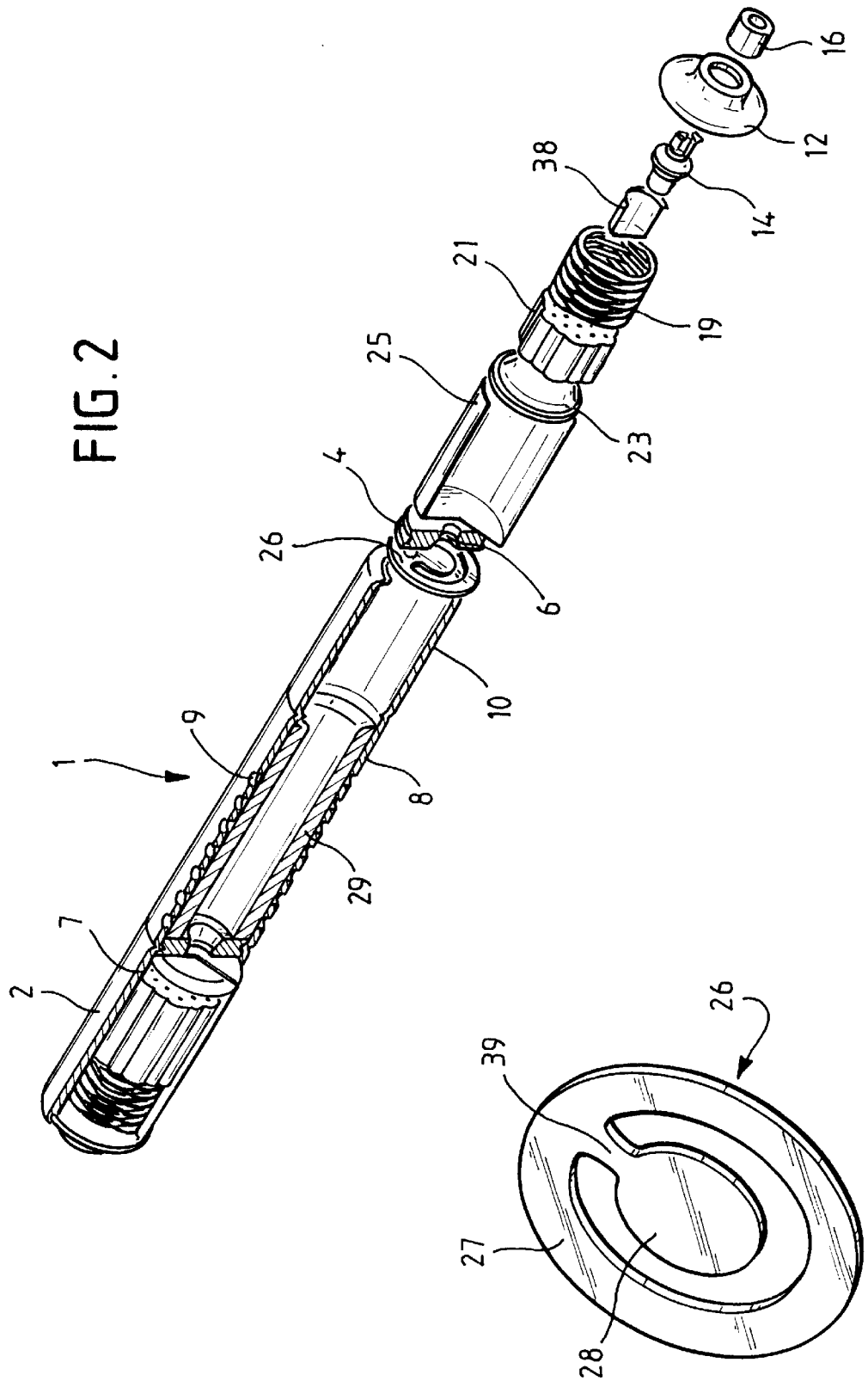

PYROTECHNIC GAS GENERATOR WITH ADAPTABLE FLOW RATE AND VOLUME FOR AIR BAGS

The invention relates to the field of motor vehicle safety and deals more specifically with a pyrotechnic hot-gas generator for inflating air bags.

Recently, new generators have appeared which, by means of two electric initiators placed in two separate combustion chambers, allow the flow rate of the generator to be altered as a function of various parameters such as the temperature, the nature and intensity of the impact, the size and the position of the passenger. The triggering of the two initiators is generally offset in time by a few milliseconds. This offset is achieved electronically and in a way that can be programmed with respect to time so that the flow rate of the generator and therefore the amount of pressure obtained in the bag can be optimized.

U.S. Pat. No. 5,219,178 describes a "passenger" protechnic hot-gas generator which comprises two combustion chambers each having a pyrotechnic charge and an initiator and which are separated from one another by a diffusion chamber. At the time of an impact, a first combustion chamber is fired using one initiator and the gases generated by the combustion of the pyrotechnic charge, after filtration, reach the diffusion chamber. These gases thus, within a time scale of the order of twenty milliseconds, cause a phase of slow inflation of the air bag, which allows the passenger to be positioned correctly in his seat. The second combustion chamber is then initiated and there follows a phase of rapid inflation of the bag which brings about full deployment of the bag. However, this generator, which makes it possible to alter the rate of inflation of the bag, cannot limit the final volume of gas released into the bag to suit the circumstances.

European patent application EP 0,428,298 discloses a pyrotechnic hot-gas generator, the body of which consists of two separate cylinders of different lengths pushed onto a connecting system. This generator thus has two combustion chambers flanking a diffusion chamber and each of which is separated from the latter by a metal plate supported by the connecting system. Depending on the severity of the impact, it is then possible to initiate either one or other of two combustion chambers as desired, or both chambers simultaneously. Thus, this system makes it possible to limit the volume of gas generated, but on the other hand does not make it possible to alter the rate of inflation of the air bag. What is more, a generator of this kind is relatively complicated to manufacture, and this considerably restricts its application in the field of motor vehicle safety.

Those skilled in the art are therefore looking for a pyrotechnic gas generator which is easy and inexpensive to manufacture and which makes it possible, depending on circumstances, to release either just a certain volume of gas and therefore to inflate the air bag only partially or to release the maximum volume of gas in order to inflate the bag fully, with the possibility of regulating the rate of inflation.

The invention therefore relates to a pyrotechnic hot-gas generator intended for motor vehicle safety, comprising in particular a cylindrical tube which has a side wall the length of the generatrices of which exceeds its outside diameter, two pyrotechnic charges and two firing systems, characterized in that:

i) the tube is a one-piece cylindrical tube,
ii) two internal partitions each carrying a nozzle which is initially closed off are crimped into the said side wall in such a way as to split the said tube into a continuous upstream part, an intermediate part which has holes and a continuous downstream part, the said upstream part and downstream part each containing a pyrotechnic charge,
iii) the said tube is closed at each of its ends by a blanking ring in which a firing system is inserted,
iv) a safety valve rests against the partition crimped into the side wall at the boundary between the intermediate part and the downstream part of the tube so as to isolate the downstream part from the gases coming from the upstream part.

According to an essential feature of the invention, the safety valve therefore makes sure that the firing of the pyrotechnic charge contained in the downstream part can take place only as a result of the firing of the firing system housed in the said downstream part. It is thus possible:

either to release only a limited volume of gas, and therefore to inflate the bag only partially, by initiating just the firing system which is housed in the upstream part, or to inflate the airbag fully by initiating both firing systems simultaneously, or with a certain offset with respect to time, the offset firing making it possible to alter the rate at which the bag is inflated.

As a preference, the pyrotechnic charge consists either of a pyrotechnic composition chosen from the group of so-called "double base" compositions, that is to say compositions based on nitrocellulose and on nitroglycerine, or of a composite pyrotechnic composition based on an organic binder and at least one oxidizing charge.

Advantageously, each pyrotechnic charge is isolated form the side wall by a cylindrical casing thus, the drawback exhibited by so-called "double base" compositions, and which consists in the fact that they deteriorate over time when in contact with a ferrous material is avoided, which ensures correct and reliable combustion of the pyrotechnic charge. Furthermore, when the pyrotechnic charge consists of a composite pyrotechnic composition, the cylindrical casing which contains the said pyrotechnic charge makes it possible to maintain enough pressure to guarantee firing of the charge and to protect the charge from moisture in the surroundings.

As a preference, the intermediate part with holes constitutes a diffuser.

According to a second feature, a filtration and support mesh is placed in the said upstream part and the said downstream part between the pyrotechnic charge and the closed-off nozzle.

According to a third feature, a spring is placed in the said upstream part and the said downstream part between the blanking ring and the pyrotechnic charge so as to wedge the said charge against the filtering mesh.

According to a first preferred embodiment, the cylindrical casing in the said upstream part and the said downstream part encases the spring, the pyrotechnic charge and the filtering mesh. The cylindrical casing is then in the form of a cylindrical case which has a closed end pressed against the nozzle and acting as a rupture disc.

According to a second preferred embodiment, the cylindrical casing in the said upstream part and the said downstream part is in the form of a tubular casing containing only the pyrotechnic charge, the nozzle then being closed off by a separate rupture disc.

Advantageously, a cylindrical condenser is pressed against the internal side wall of the tube in the intermediate part. The condenser may, for example, consist of a roll of mesh.

As a preference, each pyrotechnic charge is in the form of a cylindrical block perforated by a number of channels parallel to the axis of the said block so that the said channels are parallel to the axis of revolution of the tube.

According to a third preferred embodiment, the safety valve is housed in the intermediate part facing the partition crimped into the side wall at the boundary between the intermediate part and the downstream part of the tube.

As a preference, the safety valve consists of a one-piece cylindrical component comprising a peripheral ring connected by a tab to a central disc, the surface-area of which is at least equal to the cross-sectional area of the exit of the nozzle borne by the said partition.

A generator according to the invention therefore has the following two advantages:

On the one hand, its manufacture involves only a small number of components the assembly of which can be easily automated, which allows a very substantial reduction in the cost of manufacture, while guaranteeing correct and reliable inflation of the air bag.

On the other hand, the fact that the volume of gas generated or the rate at which the bag inflates can be modified provides protection that is adapted to suit the severity of the impact.

A detailed description of the preferred embodiment is given hereinbelow with reference to FIGS. 1 to 3.

FIG. 2 is a partially exploded perspective view of the generator depicted in FIG. 1.

FIG. 3 is a perspective view of the safety valve of the generator depicted in FIGS. 1 and 2.

Figure 1:
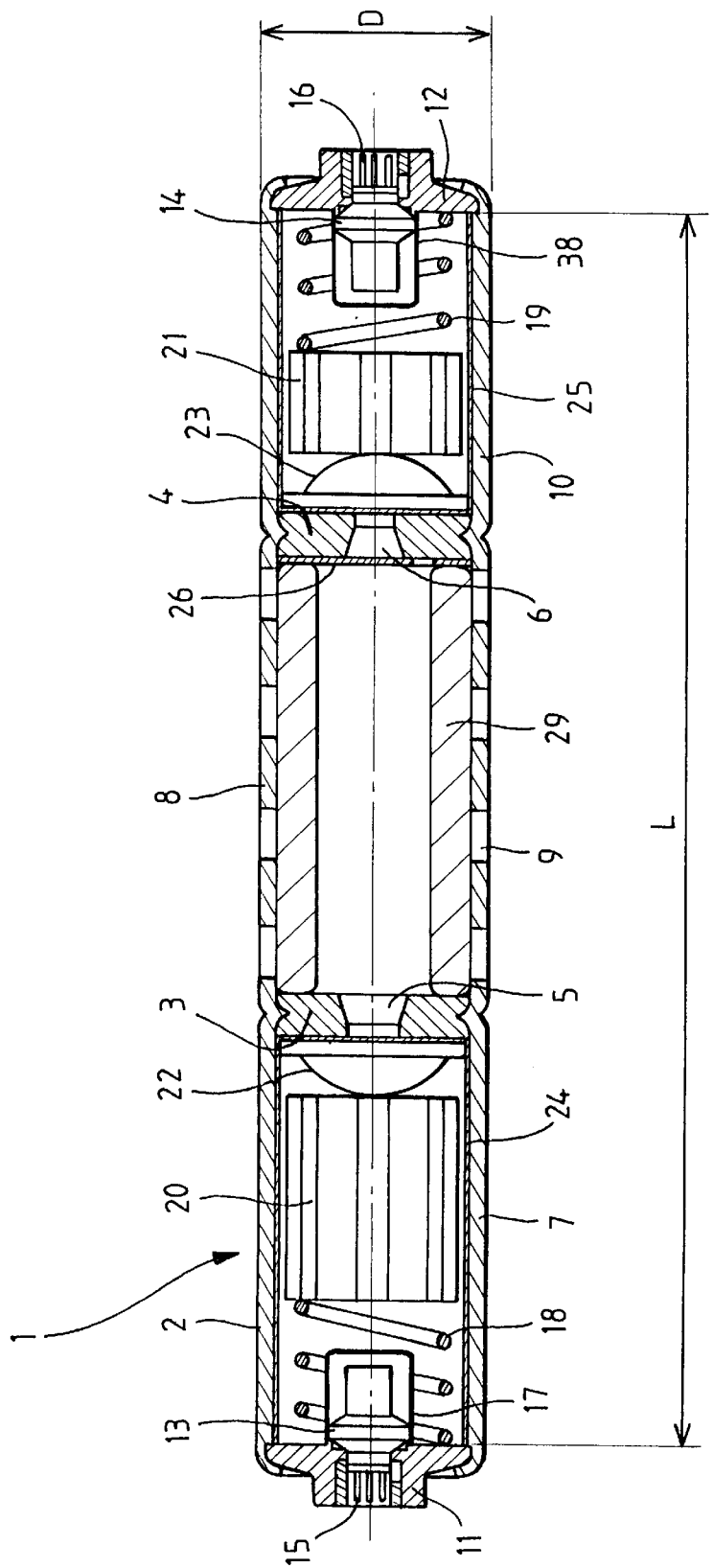
FIG. 1 is a longitudinal section through a generator according to the invention.

Referring to FIGS. 1 to 3, we can see that a pyrotechnic hot-gas generator according to the invention comprises a cylindrical tube 1 made of a metal that is ductile enough that it can be crimped, that is to say a metal which preferably has a capacity for elongation of greater than 20%, and a breaking strength higher than 400 MPa. This tube 1 has two open ends and has a side wall 2 the length L of the generatrices of which is greater than its outside diameter D. In the example depicted in FIGS. 1 and 2, the length L is more or less equal to six times the outside diameter D. Two internal partitions 3, 4 each carrying a nozzle 5, 6 are crimped into the side wall 2 in such a way as to split the tube 1 into a continuous upstream part 7, an intermediate part 8 which has holes 9 and a continuous downstream part 10.

In both the said upstream part 7 and the said downstream part 10, the open end of the tube 1 is closed by a blanking ring 11, 12 in which there is inserted an electric igniter 13, 14, the connector of which is protected by a shunt 15, 16. The igniter 13, 14 is surmounted by a fragmentable metal cap 17, 38 containing a firing powder, such as a powder of the boron/potassium nitrate type, for example, and is surrounded by a coil spring 18, 19. This spring 18, 19 rests both against the blanking ring 11, 12 and against one end of a cylindrical block 20, 21 which constitutes the pyrotechnic charge and which is perforated by 19 channels parallel to the axis of the block 20, 21, this axis being coincident with the axis of revolution of the tube 1. The other end of the block 20, 21 butts up against a filtering mesh 22, 23 which is convex with respect to the said block 20, 21. A cylindrical case 24, 25 with an open end resting against the blanking ring 11, 12 and a closed end pressed against the internal partition 3, 4 acts as a rupture disc for the nozzle 5, 6 borne by this partition and encloses the spring 18, 19, the block 20, 21 and the filtering mesh 22, 23.

Advantageously, the length of the upstream part 7 exceeds that of the downstream part 10, and the block 20 in the said upstream part 7 is larger than the one housed in the said downstream part 10.

A safety valve 26 which consists of a one-piece cylindrical component made of metal and comprising a peripheral ring 27 connected by a tab 39 to a central disc 28, the surface-area of which is at least equal to the cross-sectional area of the exit of the nozzle 6, is placed in the intermediate part 8 facing the partition 4 which is crimped into the side wall 2 at the boundary between the intermediate part 8 and the downstream part 10 of the tube 1. The central disc 28 therefore closes off the exit orifice of the nozzle 6. A porous cylindrical condenser 29, for example made using a roll of mesh, is pressed against the internal side wall 2 in the intermediate part 8 and, on the one hand, has an open end resting against the partition 3 crimped into the side wall 2 at the boundary between the upstream part 7 and the intermediate part 8 and, on the other hand, has another open end resting against the safety valve 26.

A generator of this kind, coupled to a multi-function detection system, allows the following operating schemes. In the event of a light impact, a signal emitted by a collision dedector triggers the firing of the igniter 13 in the upstream part 7, which then ignites the firing powder. The gases of combustion which are generated blow off the cap 17 and come into contact with the block 20, thus firing the said block 20. When the pressure reaches the rupture strength of the case 24 which closes off the nozzle 5, the case ruptures near the said nozzle 5 and the gases enter the intermediate part 8 of the tube 1, pass through the porous condenser 29 and escape through the holes 9 to inflate the air bag. The safety valve 26, bearing in mind its situation in the intermediate part 8, therefore makes it possible to prevent the hot gases generated by the block 20 in the upstream part 7 from rupturing the case 25 of the downstream part 10 near the nozzle 6 and thus firing the block 21.

If the impact is more severe, the igniter 14 in the downstream part 10 is fired after the igniter 13 with a delay which is programmed with respect to time. The block 21 is fired in a similar way, and when the pressure reaches a certain threshold, the case 25 ruptures near the nozzle 6. The gases generated therefore exert a pressure on the central disc 28 of the safety valve 26, and this causes the tab 39 to bend in the direction of the flow of gas. The gases thus enter the intermediate part 8 in order finally to inflate the air bag.

Finally, when the impact is sever, both igniters 13 and 14 are initiated simultaneously, and cause simultaneous combustion of the blocks 20 and 21.

I claim:

1. Pyrotechnic hot-gas generator intended for motor vehicle safety, comprising a cylindrical tube (1) which has a side wall (2) the length (L) of the generatrices of which exceeds its outside diameter (D), two pyrotechnic charges and two firing systems (13, 14), characterized in that:

i) the tube is a one-piece cylindrical tube,
   ii) two internal partitions (3, 4) each carrying a nozzle (5, 6) which is initially closed off are crimped into the said wide wall (2) to split the said tube (1) into a continuous upstream part (7), an intermediate part (8) which has holes (9) and a continuous downstream part (10), the said upstream part (7) and downstream part (10) each containing a pyrotechnic charge,
   iii) the said tube (1) is closed at each of its ends by a blanking ring (11, 12) in which a firing system (13, 14) is inserted,
   iv) a safety valve (26) rests against the partition (4) crimped into the side wall (2) at the boundary between the intermediate part (8) and the downstream part (10)

of the tube (1) so as to isolate the downstream part (10) from the gases coming from the upstream part (7).

2. Generator according to claim 1, characterized in that each pyrotechnic charge is isolated from the side wall (2) by a cylindrical casing (24, 25).

3. Generator according to claim 2, characterized in that the intermediate part (8) with holes (9) constitutes a diffuser.

4. Generator according to claim 3, characterized in that a filtration and support mesh (22, 23) is placed in the said upstream part (7) and the said downstream part (10) between the pyrotechnic charge and the closed-off nozzle (5, 6).

5. Generator according to claim 4, characterized in that a spring (18, 19) is placed in the said upstream part (7) and the said downstream part (10) between the blanking ring (11, 12) and the pyrotechnic charge so as to wedge the said charge against the filtering mesh (22, 23).

6. Generator according to claim 5, characterized in that the cylindrical casing (24, 25) in the said upstream part (7) and the said downstream part (10) encases the spring (18, 19), the pyrotechnic charge and the filtering mesh (22, 23).

7. Generator according to either one of claims 5 and 6, characterized in that a cylindrical condenser (29) is pressed against the internal side wall (2) of the tube (1) in the intermediate part (8).

8. Generator according to claim 1, characterized in that each pyrotechnic charge is in the form of a cylindrical block (20, 21) perforated by a number of channels parallel to the axis of the said block (20, 21) so that the said channels are parallel to the axis of revolution of the tube (1).

9. Generator according to claim 1, characterized in that the safety valve (26) is housed in the intermediate part (8) facing the partition (4) crimped into the side wall (2) at the boundary between the intermediate part (8) and the downstream part (10) of the tube (1).

10. Generator according to claim 9, characterized in that the safety valve (26) consists of a one-piece cylindrical component comprising a peripheral ring (27) connected by a tab (39) to a central disc (28), the surface-area of which is at least equal to the cross-sectional area of the exit of the nozzle (6) borne by the partition (4).

* * * * *